United States Patent
Hsiao et al.

(10) Patent No.: US 7,338,324 B2
(45) Date of Patent: Mar. 4, 2008

(54) CARD CONNECTOR WITH EJECTOR

(75) Inventors: Hsueh-Lung Hsiao, Tu-Cheng (TW); Wei-Cheng Chang, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/645,454

(22) Filed: Dec. 26, 2006

(65) Prior Publication Data

US 2007/0149056 A1    Jun. 28, 2007

(30) Foreign Application Priority Data

Dec. 26, 2005    (TW) .............................. 94222618 U

(51) Int. Cl.
*H01R 24/00*    (2006.01)

(52) U.S. Cl. ...................... 439/630; 439/632

(58) Field of Classification Search ................ 439/159, 439/630, 632
See application file for complete search history.

(56) References Cited

U.S. PATENT DOCUMENTS

| | | | |
|---|---|---|---|
| 6,554,627 B1 * | 4/2003 | Chen .......................... | 439/159 |
| 6,839,431 B2 * | 1/2005 | Ooya et al. ............ | 379/433.09 |
| 7,048,558 B2 * | 5/2006 | Fan ............................. | 439/157 |
| 7,174,633 B2 * | 2/2007 | Onuma ........................ | 29/854 |
| 2002/0132527 A1 | 9/2002 | Ito | |

\* cited by examiner

*Primary Examiner*—James Harvey
*Assistant Examiner*—Travis Chamebrs
(74) *Attorney, Agent, or Firm*—Wei Te Chung

(57) ABSTRACT

A card connector comprises an insulating housing, a plurality of contacts, an ejector and a pressing member. The insulating housing has a rear wall and a pair of arms extending from lateral ends of the rear wall; the ejector is received on one of the arm and comprises a slider movable in a card insertion/ejecting direction, a spring and a guiding pin, the slider defines a heart groove on an outside surface thereof, and the guiding pin and the heart groove forms a locking member to lock the slider in a final position. The pressing member has a retaining portion and a pressing portion, the retaining portion is retained to a bottom surface of the insulating housing by a hot-melt way, the pressing member presses the guiding pin toward the heart groove to prevent the guiding pin from jumping out from the heart groove.

11 Claims, 7 Drawing Sheets

CARD CONNECTOR WITH EJECTOR

BACKGROUND OF THE INVENTION

1. Field of the Invention

The present invention is generally related to a card connector, and especially to a card connector which is adapted for insertion/ejecting of a card.

2. Description of Related Art

A card connector is generally used as an expanded recording apparatus of an electronic equipment such as a personal computer or a digital camera. PC card or memory card is installed in the card connector to electrically connect with the card connector for writing and reading necessary information. The card connector comprises an insulating housing for receiving a card, a plurality of contacts received in the insulating housing for electrically contacting with the card, a shell covering the insulating housing and an ejector for ejecting the card.

The ejector is often formed with a slider being movable in a card insertion/ejecting direction and defining a heart groove, a spring and a guiding pin with two ends, one end retained to the insulating housing, and the other end movably received in the heart groove. The guiding pin and the heart groove form a locking member, which can lock the slider in a final position against the force of compressed spring. And the card connector often has a component pressing the guiding pin toward the heart groove to prevent the guiding pin from jumping out from the heart groove. Such a component may be an elastic piece stamped from the shell and connecting with the shell at an end thereof. However, since the shell is thin, the elastic piece is easily broken at the joint.

U.S. Pat. No. 6,839,431 discloses an improved card connector including an insulating housing, a plurality of SMT (surface mounting technology) contacts, a metal shell and a common ejector and a separate metal piece. The metal piece is assembled to a sidewall of the insulating housing and located between an outside of the sidewall and a sidewall of the shell. The metal piece has a elastic arm pressing the guiding pin to ward the heart groove, a retaining portion engaging with the insulating housing and a tail extending beyond the insulating housing and soldered to a print circuit board. However, the insulating housing defines slot for retaining the metal piece in addition, and the tail of the metal piece must in a same surface with the tails of the contacts for being soldered to the print circuit board, that increase the difficulties of the assembly and the costs of the electrical card connector.

Hence, an improved card connector is highly desired to overcome the aforementioned disadvantages of the prior art.

SUMMARY OF THE INVENTION

Accordingly, an object of the present invention is to provide a card connector, which has an ejector being able to engaging with two different cards.

To achieve the above object, a card connector has an insulating housing, a plurality of contacts received in the insulating housing, an ejector and a pressing member. The insulating housing defines a card receiving space and a card insertion/ejecting direction, the ejector is received in the insulating housing and comprises a slider, a spring and a guiding pin, the slider defines a heart groove and is movable along the card insertion/ejecting direction, the guiding pin and the heart groove form a locking member to lock the slider in a final position; and the pressing member has a horizontal retaining portion retained to a bottom surface of the insulating housing and a pressing portion pressing the guiding pin toward the heart groove. The retaining portion defines a hole, and the insulating housing correspondingly provides a post, which passes through the hole and retains the pressing member to the insulating housing.

Other objects, advantages and novel features of the present invention will be drawn from the following detailed description of a preferred embodiment of the present invention with attached drawings.

DETAILED DESCRIPTION OF THE INVENTION

Reference will now be made in detail to the preferred embodiment of the present invention.

Figure 1:
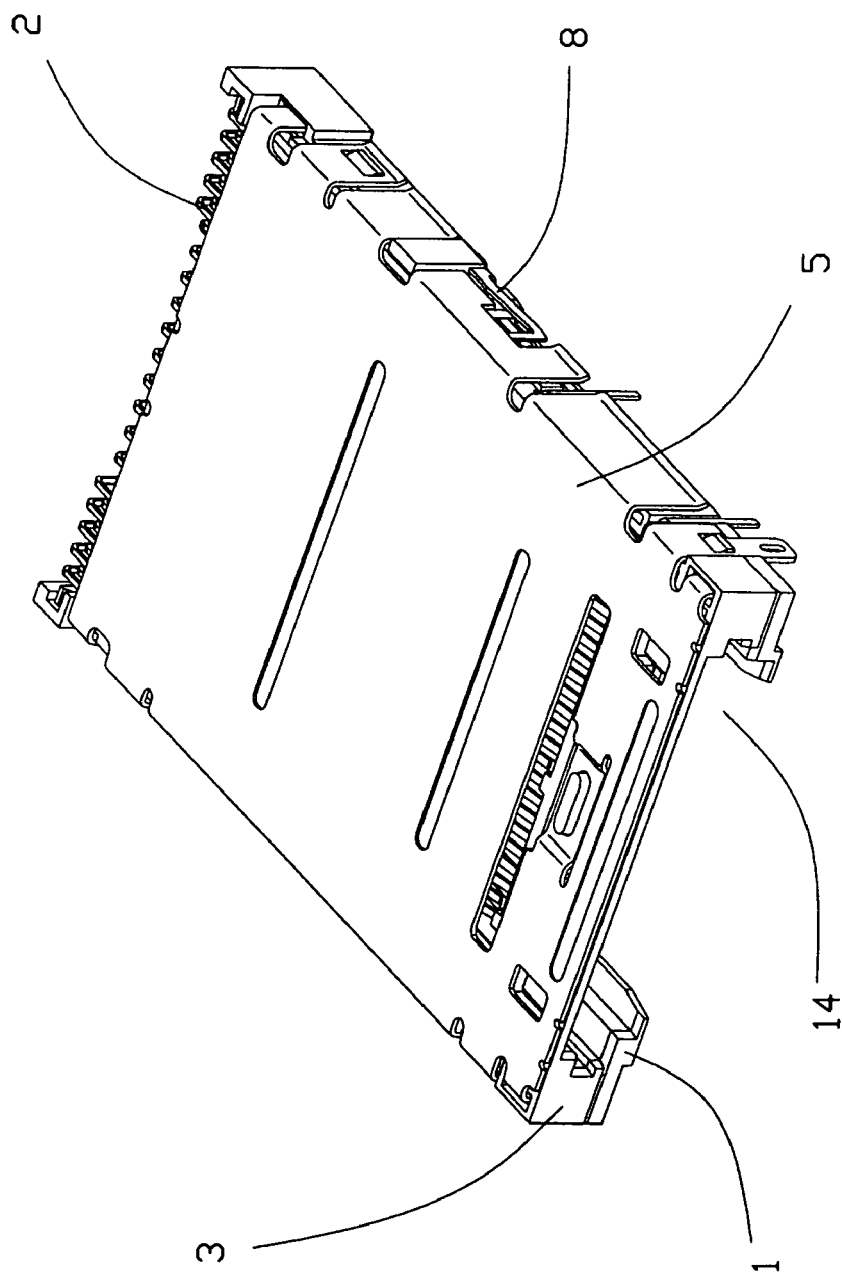
FIG. 1 is an assembled, perspective view of a card connector in accordance with the present invention.
Figure 2:
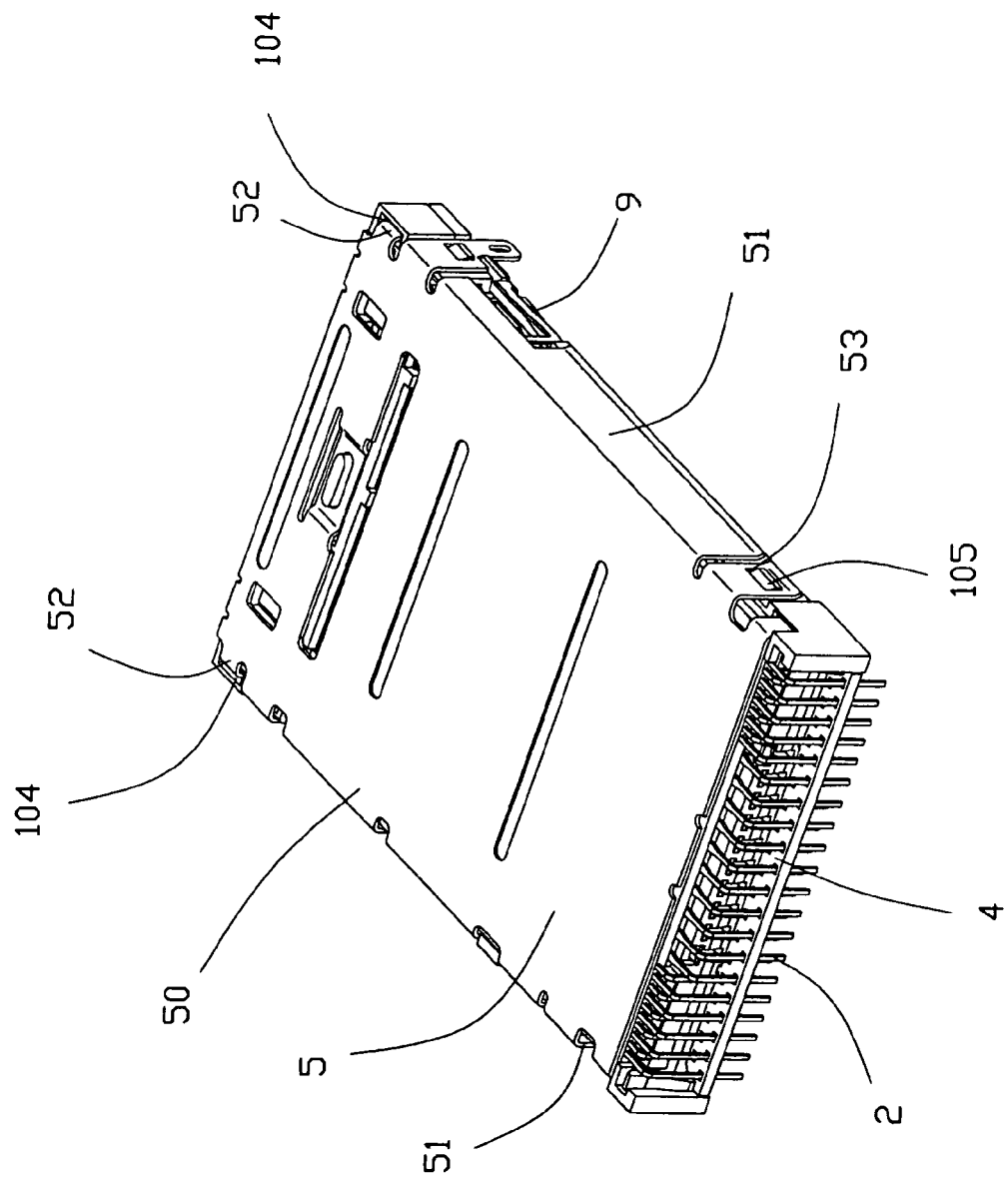
FIG. 2 is another assembled, perspective view of the card connector in accordance with the present invention.

Referring to FIG. 1 and FIG. 2, the card connector in accordance with the present invention is adapted for different cards, such as XD (XD-picture) card, MS (Memory Stick) card, SD (Super Density, Secure Digital) card and MMC (Multi-Media card). The card connector comprises an insulating housing 1, a plurality of contacts 2 received in the insulating housing 1, a bridge 3, a spacer 4, a shell 5 covering the insulating housing 1 an ejectors (not labeled) and a first metal piece 8 and a metal piece 9. The bridge 3 is assembled in a front end of the insulating housing 1 to define an inserting port 14 together with the arms 11 of the insulating housing 1, the spacer 4 is set in a rear end of the insulating housing 1 for guiding and retaining the contacts 2 to a print circuit board (not shown).

Figure 3:
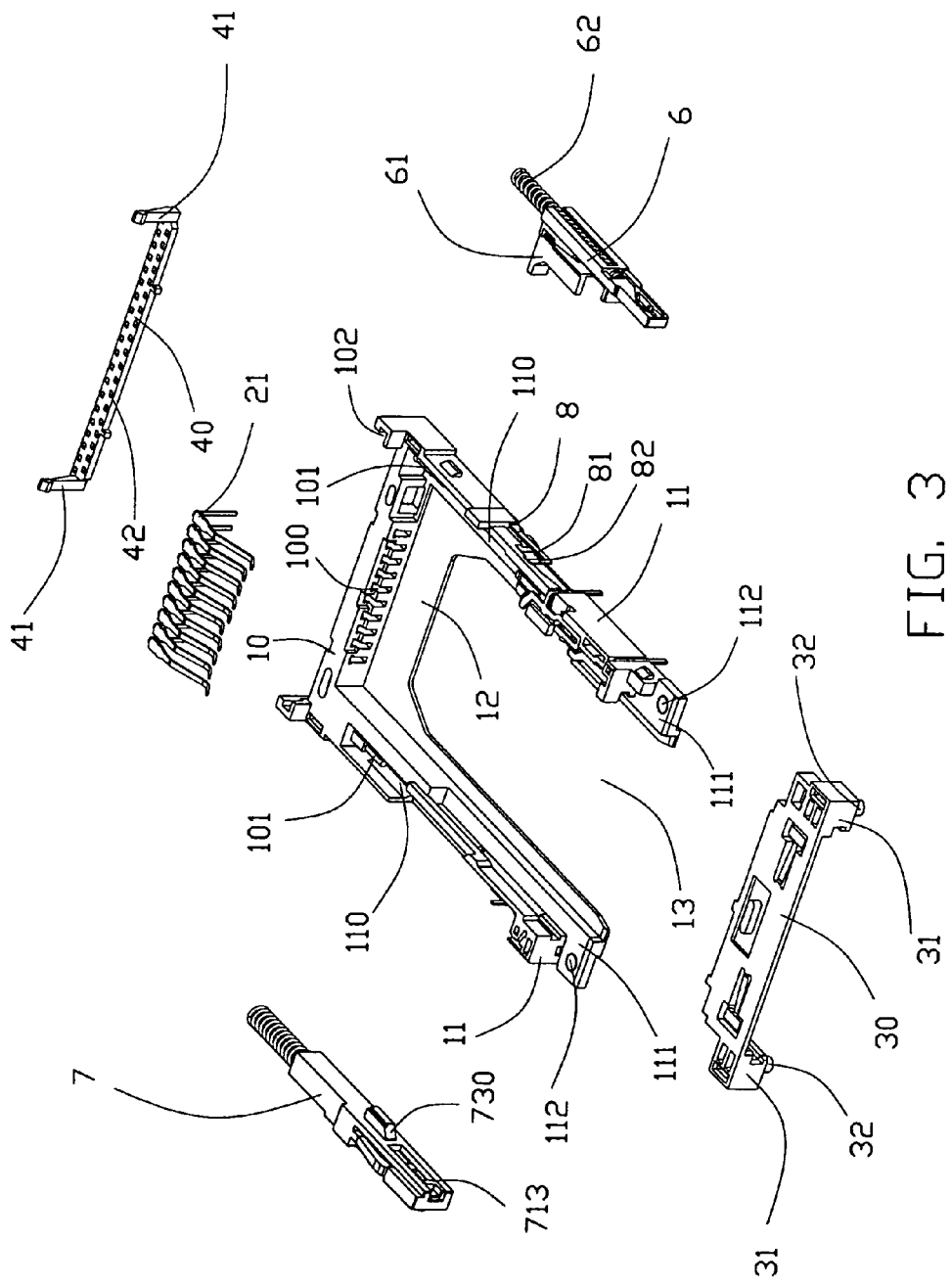
FIG. 3 is a partially assembled, perspective view of the card connector in accordance with the present invention.
Figure 4:
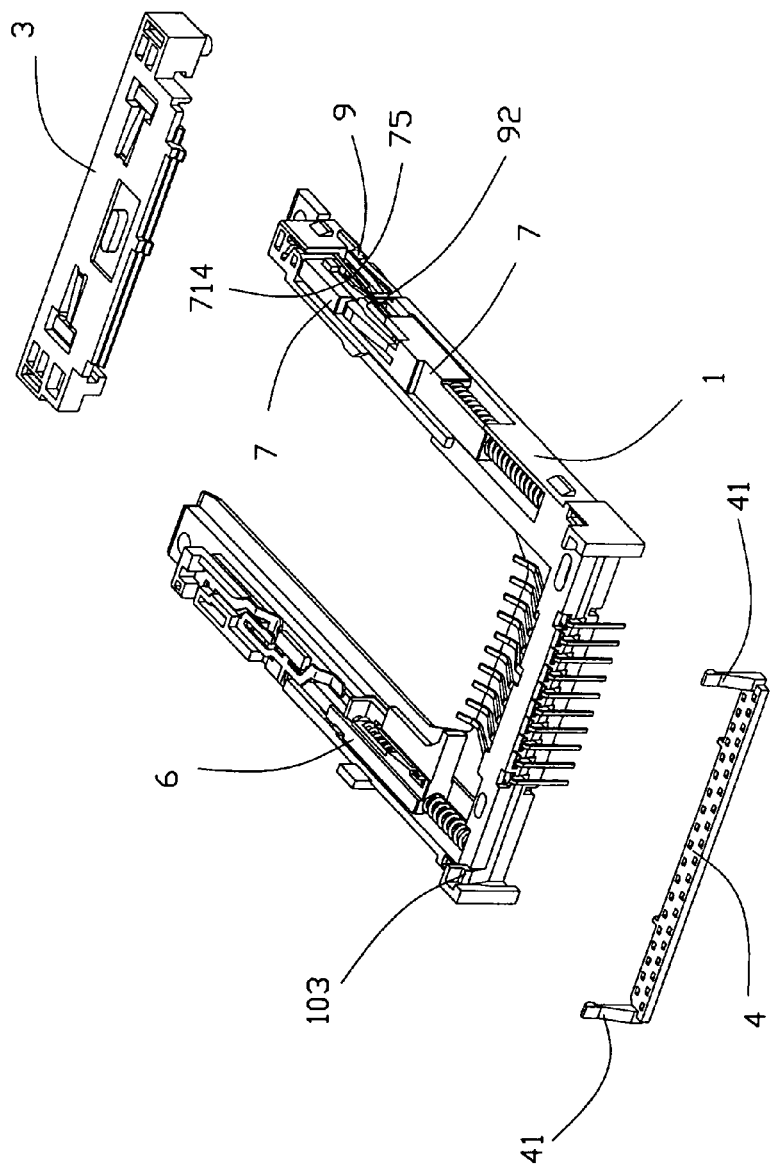
FIG. 4 is another partially assembled, perspective view of the card connector in accordance with the present invention.

Referring to FIG. 3 and FIG. 4, the insulating housing 1 is in an U-shape and comprising a rear wall 10, a right and a left arms 11 extending from lateral sides of the rear wall 10 and an U-shaped bottom wall 12 linking the rear wall 10 and the arms 11, the rear wall 10, two arms 11 and the bottom wall 12 define a card receiving space 13 for the cards. Each arm 11 defines a slot 110 for receiving corresponding ejector, the right arm 11 receives a switch means (not labeled). The rear wall 10 is formed with a plurality of passages 100 and a pair of guiding posts 101 respectively extending in to the slots 110, Each arm 11 is formed with an engaging portion 111 on a front end far from the rear wall 10, each engaging portion 111 defines an engaging hole 112. A room 102 is defined on a rear side of the rear wall 10 for receiving the spacer 4 and provides a pair of latching protrusions 103 on opposed ends thereof.

Referring to FIG. 3 and FIG. 4, and conjoining with FIG. 1 and FIG. 2, the bridge 3 is approximately in an upside-down U-shape and comprises an horizontal board 30 and two lateral boards 31 extending from lateral ends of the horizontal board 30. Each lateral board 31 is provided with an engaging pole 32 on a bottom surface thereof, which engages with and fixes to corresponding engaging holes 112 of the insulating housing 1 in a hot-melt process to assemble the bridge 3 to a front end of the insulating housing 1. The bridge 3 is formed with a plurality of guiding faces (not labeled) on inner sides thereof and defines the inserting port 14 together with the front ends of the arms 11 of the insulating housing 1.

The spacer 4 is approximately in an U-shape and comprises an transverse board 40 and two latching arms 41, the transverse board 40 is formed with a plurality of through hole 42 for the contacts 2 passing through. The spacer 4 inserts into the room 102 of the insulating housing 1 from bottom to top, the latching arms 41 engage with the latching protrusions 103 to fix the spacer 4 to the insulating housing 1.

Figure 5:
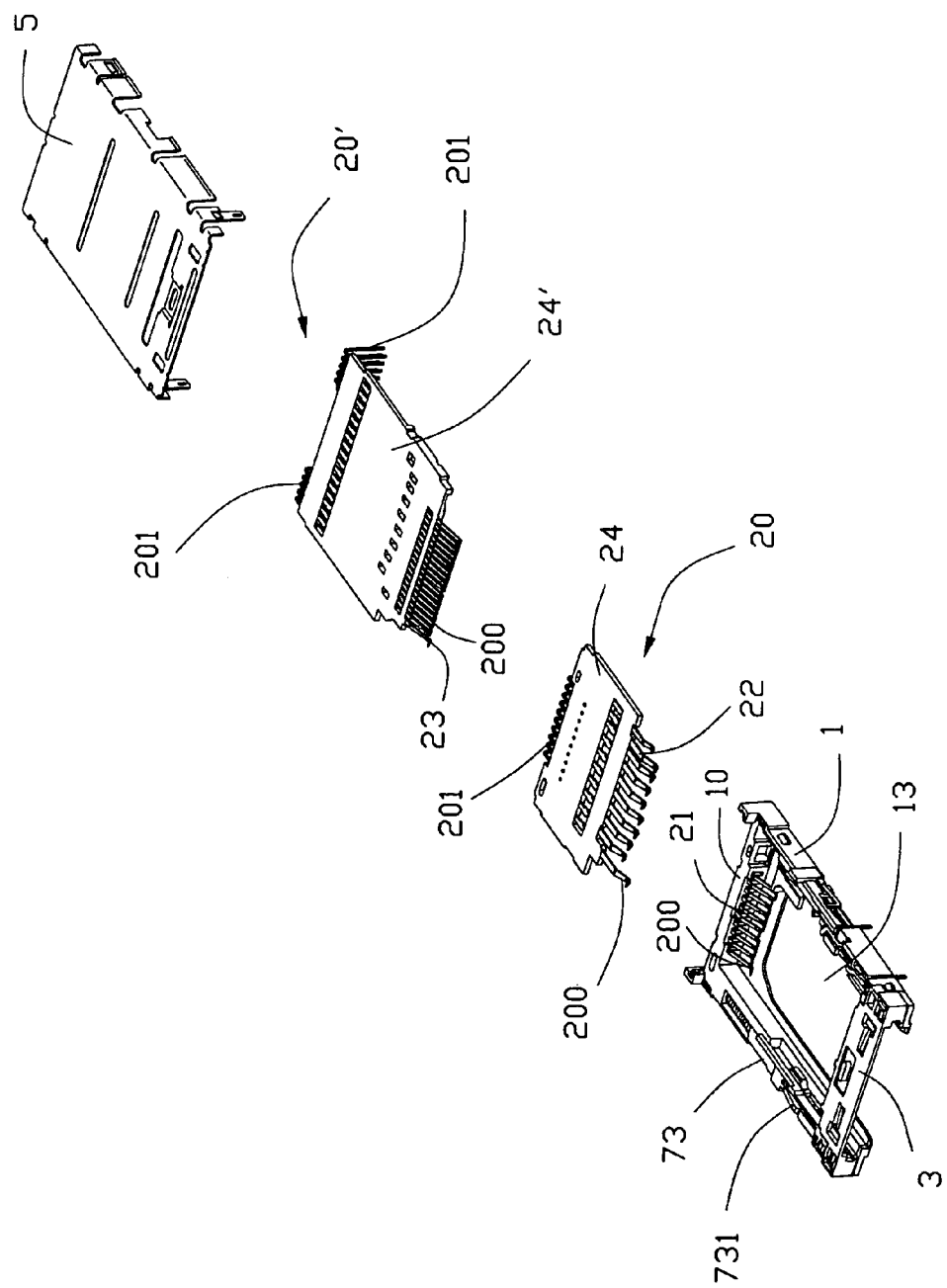
FIG. 5 is an exploded, perspective view of the card connector in accordance with the present invention.

Referring to FIG. 5, the contacts 2 includes a plurality of first contacts 21 for MS card, a plurality of second contacts 22 for SD/MMC card, a plurality of third contacts 23 for XD card. The second contacts 22 is retained to a first insulating board 24 to form a first contact module 20 together, the third contacts 23 is retained to a second insulating board 24' to form a second contact module 20'. Each contact 2 has a contacting portion 200 for contacting with corresponding card and a tail 201 for being soldered to the print circuit board. The contacting portions 200 of the second contacts 22 and the third contacts 23 respectively extend from front edges of the insulating boards 24, 24' to the card receiving space 13, and the corresponding tails 201 extend from rear edges of the insulating board 24, 24' downwardly. Wherein, the tails 201 of the third contacts 23 are divided into two groups to extend downwardly with a space between for setting the tails of the second contacts 22.

Conjoining with FIG. 1 and FIG. 2, the first contacts 21 are inserted into and retained to the passages 100 of the rear wall 10 from a rear face of the insulating housing 1, after that, the spacer 4 is assembled to the room 102 of the insulating housing 1, and then the first and the second contact modules 20, 20' are assembled to the insulating housing 1 from top to bottom in turn, all the contacting portions 200 are extending into the card receiving space 13 and all the tails 201 are extending through the through hole 42 of the spacer 4 and beyond the insulating housing 1 for being soldered to the print circuit board.

Referring to FIG. 2, the shell 5 comprises a top plate 50 and oppose side walls 51 and is formed with a plurality of latching pieces 52 and latching holes 53, and the insulating housing 1 is correspondingly formed with a plurality of latching slots 104 and projection portions 105, the shell 5 fixes to the insulating housing 1 in virtue of engaging of the latching pieces 52 and the latching slots 104 and engaging of the latching hole 53 and the projecting portion 105 to cover the insulating housing 1.

Figure 6:
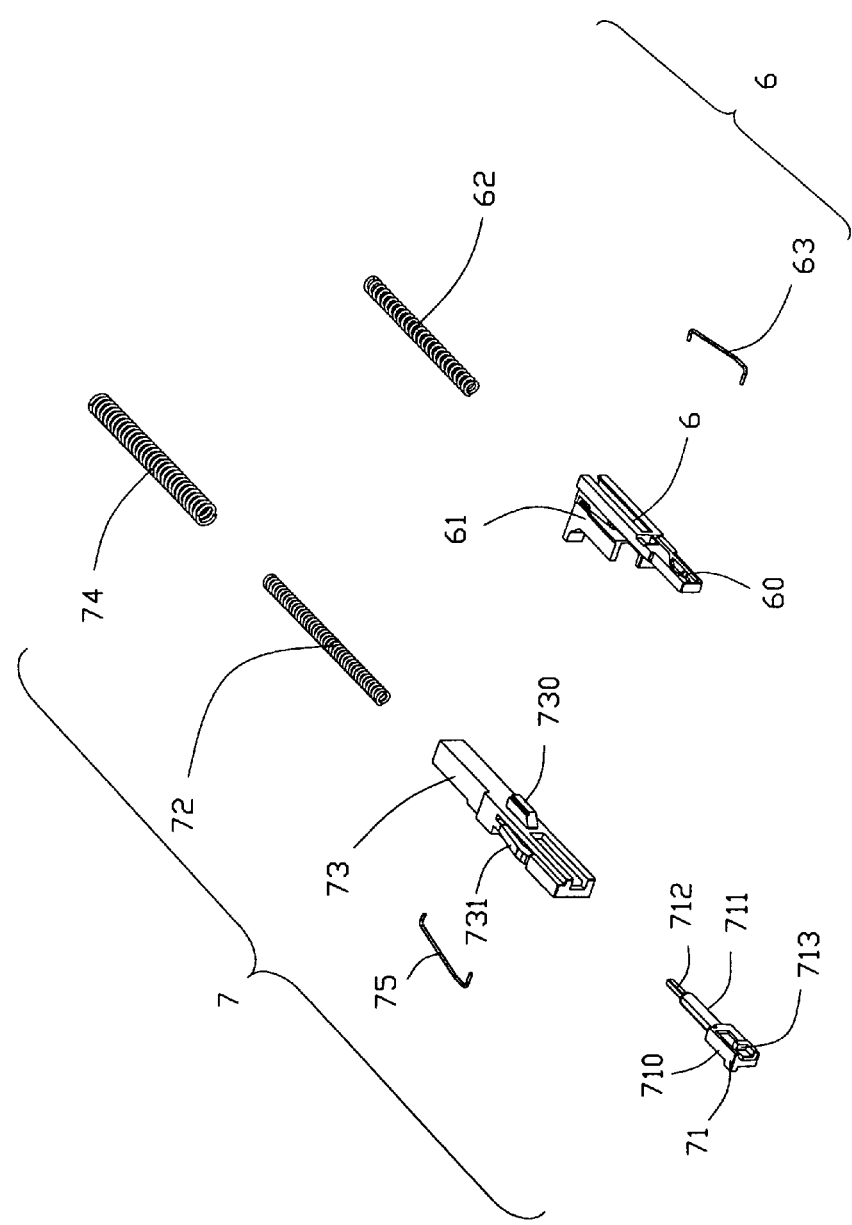
FIG. 6 is an exploded, perspective view of an ejector of the card connector in accordance with the present invention.

Referring to FIG. 6, and conjoining with FIG. 3 and FIG. 4, the ejectors include a first ejector 6 and a second ejector 7. The first ejector 6 is used for ejecting the MS card and comprises a slider 61 with a heart groove 60, a spring 62 and a guiding pin 63. The spring 62 is disposed between the slider 61 and the insulating housing 1 and surrounding the guiding post 101 of the insulating housing 1; the guiding pin 63 is a metal haulm with two ends, one end retained to the arm 11 of the insulating housing 1 and the other end movably disposed in the heart groove 60. The first ejector 6 is a normal push-push type, an insertion of the MS card will push the slider 61 to move and be locked at a final position, and pushing the MS card again to release the locking of the slider 61 and eject the MS card out by an elastic force of the spring 62.

The second ejector is used for XD card and SD/MMC card and comprises a first slider 71 formed with a heart groove 714, a first spring 72, a second slider 73, a second spring 74 and a guiding pin 75. The first slider 71 is received in the second slider 73, the first spring 72 is surrounded by the second spring 74, the sliders 71, 73 share a locking means composed by the heart groove 714 and the guiding pin 75.

The first slider has a base 710, a first column 711 rearward extending from the base 710 and a second column 712 further rearward extending from the first column 711, a diameter of the second column 712 being smaller than the diameter of the first column 711. The base 710 is formed with a first ejecting arm 713 at an inner side faced to the card receiving space 13 and the heart groove 714 at an out side opposed to the inner side. Both the first and the second columns 711, 712 are able to insert into the first spring 72.

The second slider 73 is a hollow frame and defines a space (not labeled) for the first slider 71. The second slider 7 is formed with a second ejecting arm 731 in the inner sidewall 730 for engaging with the SD/MMC card and an elastic arm 731 being able to lock the second slider 73 to the first slider 71. The first slider 71 movably received in the second slider 73, and the first spring 72 is surround by the second spring 74. When the XD card inserts into the card connector, the XD card just pushes the first ejecting arm 713, the first slider 71 is brought to move and compresses the first spring 72, and the guiding pin 75 moves along the heart groove 714, while the second slider 73 keeps in a original position. When the SD/MMC card inserts into the card connector, the SD/MMC card just pushes the second ejecting arm 730, the second slider 73 is brought to move and compresses the second spring 72, while the first slider 71 is pushed by the second slider 73 to move and to be locked with the first slider.

Figure 7:
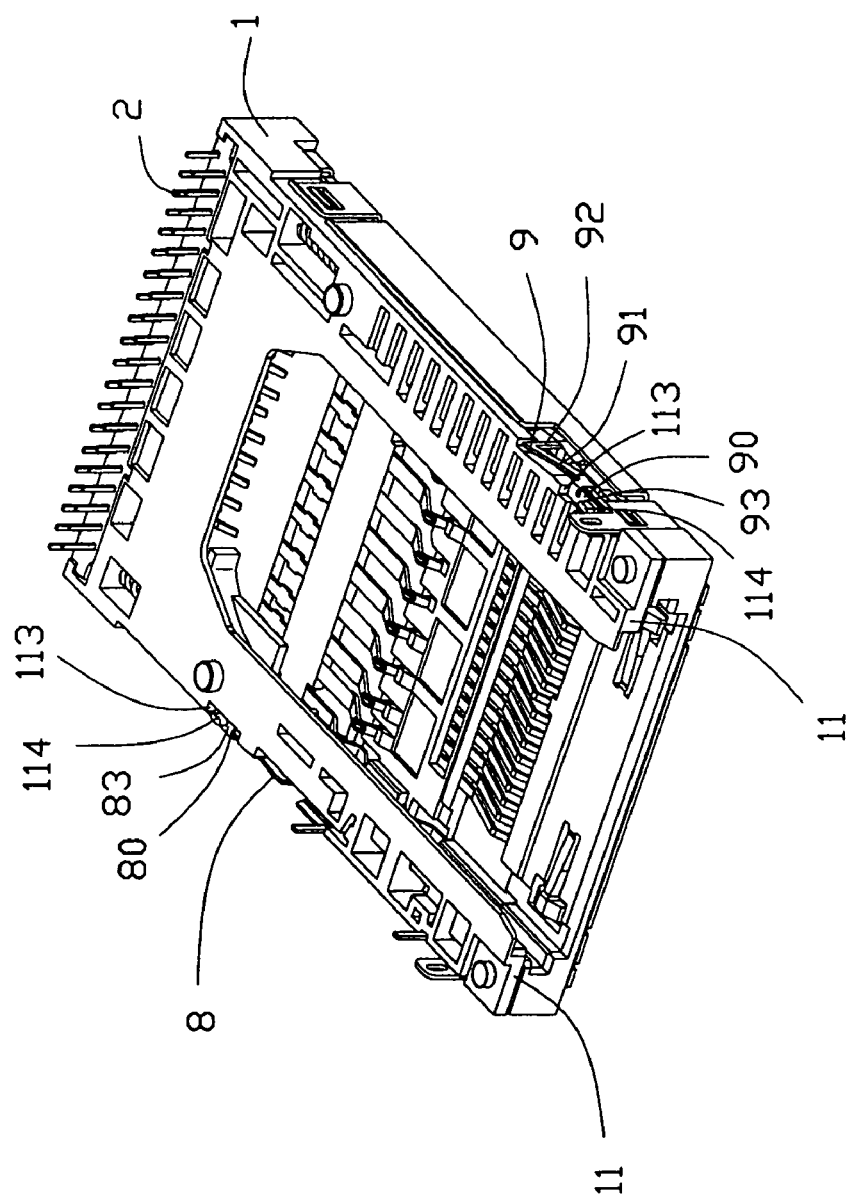
FIG. 7 is an assembled, perspective view of the card connector in accordance with the present invention, taken from a bottom face.

Referring to FIG. 7, conjoining with FIG. 3 and FIG. 4, a first pressing member 8 (referring to FIG. 3) is stamped from a metal piece and fixed to the arm 11 of the insulating housing 1. The first pressing member 8 comprises a retaining portion 80, a vertical extending arm 81 bended upwardly from an out side of the retaining portion 80 and further extending rearward and a pressing portion 82 extending upwardly from an end of the extending arm 81 away from the retaining portion 80. The retaining portion 80 defines a hole 83 at a center thereof.

The insulating housing 1 defines a recess 113 recessed from a bottom surface of the arm 11 thereof, the recess 113 is used for receiving the retaining portion 80 of the first pressing member 8 and formed with a first engaging post 114. The first pressing member 8 assembles to an outside of right arm 11 of the insulating housing 1, the retaining portion 80 setting in the recess 113, the first engaging post 114 inserting through the hole 83, the extending arm 81 and the pressing potion 82 abutting the slider 61 assembled to the insulating housing 1. The pressing portion 82 presses the guiding pin 63 toward the heart groove 60 to prevent the guiding pin 63 from jumping out from the heart groove 60. Then, the first engaging post 114 and the retaining portion 80 join together by a hot-melt way to retain the first pressing member 8 to the insulating housing 1.

The second pressing member 9 is also stamped from a metal piece and has a similar configuration with the first pressing member 8. The second pressing member 9 has a retaining portion 90 with a hole 93, an extending arm 91 extending rearward from the retaining portion 90 and a pressing portion 92. The insulating housing 1 correspondingly forms another recess 113 and a second engaging post 114 in this recess 113. The second pressing member 9 assembles to an outside of left arm 11 of the insulating housing 1 by a same assembling way for the first pressing member 8. The pressing portion 92 presses the guiding pin 75 of the second ejector 7 toward the heart groove 714 of the first slider 71 to prevent the guiding pin 75 from jumping out from the heart groove 714. Then, the second engaging post 114 and the retaining portion 90 join together in a hot-melt way to retain the second pressing member 9 to the insulating housing 1.

Referring to FIG. 1 and FIG. 2, after the shell 5 is assembled to the insulating housing 1, the side walls 51 respectively and partially cover the pressing portions 82, 92 of the first and the second pressing members 8, 9 to enhance the pressing force for pressing the guiding pin 63, 75.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector comprising:
   an insulating housing defining a card insertion/ejecting direction and a card receiving space;
   a plurality of contacts received in the insulating housing;
   an ejector received in the insulating housing and comprising a slider, a spring and a guiding pin, the slider defining a heart groove and being movable along the card insertion/ejecting direction, the guiding pin and the heart groove forming a locking member to lock the slider in a final position; and
   a pressing member comprising a retaining portion retained to the insulating housing and a pressing portion pressing the guiding pin toward the heart groove, the retaining portion defining a hole, and the insulating housing correspondingly providing a post, which passes through the hole and retains the pressing member to the insulating housing.

2. The card connector as described in claim 1, wherein the post of the insulating housing is fixed with the retaining portion of the pressing member in a hot-melt way.

3. The card connector as described in claim 2, wherein the pressing member further comprises an extending arm linking the retaining portion and the pressing portion, the retaining portion is a horizontal piece, the extending arm is bended upwardly from an out side of the retaining portion and further extending rearward, the pressing portion is extending vertically from a rear end of the extending arm.

4. The card connector as described in claim 3, wherein the insulating housing is formed with a rear wall and a pair of arms extending from lateral sides of the rear wall, the ejector is received in one of the arms, a recess is defined on a bottom surface of the arm for receiving the retaining portion and has the post therein.

5. The card connector as described in claim 4, further comprising a spacer defining a plurality of through holes for tails of the contacts to pass through.

6. The card connector as described in claim 4, further comprising a bridge assembled to a front end of the insulating housing and defining a card insert port together with the insulating housing.

7. A card connector comprising:
   an insulating housing defining a card insertion/ejecting direction and a card receiving space;
   a plurality of contacts received in the insulating housing;
   an ejector received in the insulating housing and comprising a slider, a spring and a guiding pin, the slider defining a heart groove and being movable along the card insertion/ejecting direction, the guiding pin and the heart groove forming a locking member to lock the slider in a final position; and
   a pressing member comprising a horizontal retaining portion retained to a bottom surface of the insulating housing, an extending arm bended upwardly from an out side of the retaining portion and a pressing portion on an end of the extending portion, the pressing portion pressing the guiding pin of the ejector toward the heart groove.

8. The card connector as described in claim 7, wherein the retaining portion defining a hole, and the insulating housing correspondingly providing a post, which passes through the hole and is retained to the retaining portion of the pressing member in a hot-melt way.

9. The card connector as described in claim 8, wherein a recess is defined on a bottom surface of the insulating housing for receiving the retaining portion and has the post therein.

10. An electrical connector comprising:
    an insulative housing defining a common card receiving space;
    two sets of contacts disposed in the housing;
    two guiding arms located by two sides of the common card receiving space;
    two ejectors being equipped to the corresponding guiding arms, respectively;
    each of said two ejectors including a guiding pin cooperating with a corresponding guiding groove; wherein
    each of said guiding arms is equipped with a pressing member to push the guiding pin toward the guiding groove, and said pressing members are located at two different positions in a front-to-back direction.

11. The card connector as claimed in claim 10, wherein both of the pressing members are located on outer faces of the corresponding guiding arms, respectively, and generate forces toward each other.

* * * * *